US006558597B1

(12) United States Patent
Corpus

(10) Patent No.: US 6,558,597 B1
(45) Date of Patent: May 6, 2003

(54) PROCESS FOR MAKING CLOSED-END CERAMIC TUBES

(75) Inventor: Joey Michael Corpus, Avon, IN (US)

(73) Assignee: Praxair Technology, Inc., Danbury, CT (US)

( * ) Notice: Subject to any disclaimer, the term of this patent is extended or adjusted under 35 U.S.C. 154(b) by 122 days.

(21) Appl. No.: 09/597,250

(22) Filed: Jun. 20, 2000

Related U.S. Application Data

(60) Provisional application No. 60/147,818, filed on Aug. 10, 1999.

(51) Int. Cl.[7] .......................... B29C 57/10; B29C 47/20; B29C 47/90

(52) U.S. Cl. .................... 264/209.2; 264/102; 264/161; 264/209.3; 264/328.9; 264/328.11; 264/328.12; 264/536; 264/635; 264/634; 425/380

(58) Field of Search ................................ 264/102, 161, 264/209.3, 328.9, 536, 634, 635, 209.2, 328.11, 328.12; 425/380

(56) References Cited

U.S. PATENT DOCUMENTS 2,599,268 A * 6/1952 Maculan .................. 156/89.11
2,944,288 A * 7/1960 Sherman ..................... 264/255
2,954,588 A * 10/1960 Soubier ................... 264/209.2
3,670,066 A * 6/1972 Valyi .......................... 264/148
4,256,686 A * 3/1981 Froschauer et al. ...... 264/209.2
4,364,783 A * 12/1982 Theodore et al. ...... 156/244.13
4,540,534 A * 9/1985 Grendol ....................... 249/82
4,923,655 A * 5/1990 Oshima et al. ............. 264/317
5,043,116 A * 8/1991 Oshima et al. ............. 264/317
5,346,659 A * 9/1994 Buhler et al. ............... 264/154
5,484,563 A * 1/1996 Miyazaki et al. ...... 264/328.12
5,759,459 A * 6/1998 Eckardt et al. ........... 264/40.1
5,993,985 A * 11/1999 Borglum ..................... 264/433

FOREIGN PATENT DOCUMENTS

JP 1-225506 A * 9/1989 ............. B28B/3/20
JP 3-187710 A * 8/1991 ........... B28B/21/52

* cited by examiner

*Primary Examiner*—Richard Crispino
*Assistant Examiner*—Michael I. Poe
(74) *Attorney, Agent, or Firm*—David M. Rosenblum

(57) ABSTRACT

A process for forming an end cap in an extruded ceramic tube. An end cap forming cavity of an end cap forming die is positioned so that, when the body of the end cap forming die is situated against an extrusion die, ceramic material is able to be forced into the end cap forming cavity, through a passageway communicating between the end cap forming cavity and a backfill reservoir, and into the backfill reservoir. A plunger projects into the backfill reservoir to force the ceramic material from the backfill reservoir back through the passageway and into the end cap forming cavity to compact the ceramic material so that the ceramic material within the end cap will be provided with a substantially uniform density.

2 Claims, 1 Drawing Sheet

PROCESS FOR MAKING CLOSED-END CERAMIC TUBES

CROSS REFERENCE TO RELATED APPLICATIONS

This application claims the benefit of U.S. Provisional Application Ser. 60/147,818, filed Aug. 10, 1999 which is hereby incorporated by reference as is fully set forth herein.

FIELD OF THE INVENTION

The present invention relates to a process and die for forming an end cap in a ceramic tube in which the ceramic tube is extruded into an end cap forming cavity defined in the die. More particularly, the present invention relates to such a process and die in which ceramic material is back-filled into the end cap forming cavity to compact the ceramic material so that the ceramic material within the end cap has a substantially uniform density.

BACKGROUND OF THE INVENTION

The manufacture and operation of high temperature gas separation and fuel cell reactors depends on the availability of large numbers of ceramic oxygen transport membranes. In one configuration, these membranes are configured as arrays of thin-walled tubes in shell-in-tube type reactors. Reactor systems using this configuration rely on arrays of tubes within metal reactor shells. However, it has been found that there are severe problems with maintaining gas-tight seals and tube integrity when arrays of open-ended tubes mounted in metal reactors are-thermally cycled to operating temperatures that are in excess of 1000° C.

Due to the high failure rate of such open-ended tubes, the industry has sought to develop closed-end tubes. However, this has not been a simple task because for closed-end tubes to be of commercial value, it is important that the operational and performance characteristics remain the same throughout the length of the tube including the tube end. Such tube ends must, therefore, have a uniform thickness density and strength, in relation to the tube lengths.

Ceramic tubes may be made by molding, casting, extrusion, as well as other methods known to those of skilled in the art. Commercial ceramic tubes are typically made by extrusion to provide tubes that have uniform thickness, density and strength throughout the tube length.

The ceramic material usually comprises a ceramic oxide powder in a binder. The ceramic oxide powder/binder system is typically made into a formable paste, extruded through a die to form a tube in a "green" state, thermally treated to partially remove the binder to leave a bisque fired body, followed by sintering and densification by high temperature heat treatment. If the tubes are to be closed at one end, tube closure or capping is done prior to preparation of the bisque fired body.

Although various means are known for forming open-ended ceramic tubes, tube closure methods of the prior art have proven unsatisfactory for ceramic tubes. Traditionally, tube closure has been accomplished by plugging or capping.

Plugging requires preparation of the plug in a separate operation from formation of the tube. Due to the fragility of the green body, plugging is typically done manually by moistening the plug, inserting it into an open end and molding the pieces together. Closure of tubes by plugging results in the production of tube ends having varying density and strength. Also due to the necessity to carefully control the jointing, tube closure by plugging does not represent a commercially viable means of production.

With respect to capping, extrusion of a tube requires that material be forced through a extrusion die that has an annulus at the center of which is a mandrel. The difference in diameters of the annulus and mandrel governs the tube wall thickness. To ensure uniform tube wall thickness, the mandrel is located centrally in the annulus typically by an array of suspension lets, oriented in a circular pattern at regular intervals such as at a 90-degree spacing, commonly referred to as a "spider". During extrusion, the material is split into four sections as it passes over the mandrel and "spider", and then is reunited as it passes beyond the annulus.

With conventional capping, the material is first passed through the annulus and over the mandrel and "spider" and forced into a capping die. Following formation of the cap, the length of tube is extruded. Caps formed by this method, however, typically exhibit "ghost" fissures from the 4-way division of material over the extrusion mandrel. The reason for this is the division of material produced discontinuities within the density of the ceramic material forming the end cap. Sintering of such caps do not appear to heal or the green body defects result in failure of the formed tubes at the end cap region.

As will be discussed, the present invention provides a method of capping an extruded tube by formation of an end cap having a uniform density to in turn provide a uniform strength through the tube length and end cap.

SUMMARY OF THE INVENTION

The present invention provides a process for forming an end cap in an end of a ceramic tube. In accordance with the process, an end cap forming die is positioned against a extrusion die. The end cap forming die has an end cap forming cavity, a backfill reservoir, and a passageway communicating between the backfill reservoir and the end cap forming cavity. The ceramic tube is extruded so that ceramic material forming the end of the ceramic tube is forced into the end cap forming cavity, through the passageway, and into the backfill reservoir. The ceramic material is then forced from the backfill reservoir back through the passageway and into the end cap forming cavity to compact the ceramic material within the end cap forming cavity so that the ceramic material forming the end cap has a substantially uniform density.

A portion of the ceramic material and air can preferably be discharged from the backfill reservoir prior to the ceramic material being forced back to the end cap forming cavity. The extruding of the tube can be suspended prior to the ceramic material being forced from the backfill reservoir.

Preferably, back fill reservoir is elongated and is provided with ports for discharging the portion of the ceramic material and the air. In such embodiment, the ceramic material is forced back into the end cap forming cavity by an elongated plunger projecting into the backfill reservoir. The elongated plunger covers the ports during the forcing of the ceramic material and is retracted so that the ports are uncovered during discharge of the portion of the ceramic material from the backfill reservoir.

In another aspect, the present invention provides an end cap forming die for forming an end cap in an end of a ceramic tube. In accordance with this aspect of the present invention, the die is provided with a body configured to be situated against a extrusion die. The body has an end cap forming cavity to form the end cap, a backfill reservoir to receive ceramic material forming the ceramic tube from the end cap forming cavity, and a passageway communicating between the end cap forming cavity and the backfill reservoir. The end cap forming cavity is positioned so that when the body is situated against the extrusion die, ceramic material forming the end of the ceramic tube is able to be forced into the end cap forming cavity, through the passageway, and into the backfill reservoir. A plunger projects into the backfill reservoir to force the ceramic material from the backfill reservoir back through the passageway and into the end cap forming cavity to compact the ceramic material within the end cap forming cavity so that the ceramic material forming the end cap has a substantially uniform density.

The backfill reservoir can be of elongated configuration and can be provided with ports for discharging the ceramic material and air. The plunger can also be elongated and configured to cover the ports when the ceramic material is forced back into the end cap forming cavity. The plunger retracts to uncover the ports when the ceramic material and air is discharged Preferably, the backfill reservoir, the passageway, and the end cap forming cavity are coaxial.

BRIEF DESCRIPTION OF THE DRAWINGS

While the specification concludes with claims distinctly pointing out the subject matter that Applicant regards as his invention, it is believed that the invention will be better understood when taken in connection with the accompanying figures in which:

DETAILED DESCRIPTION

Figure 1:
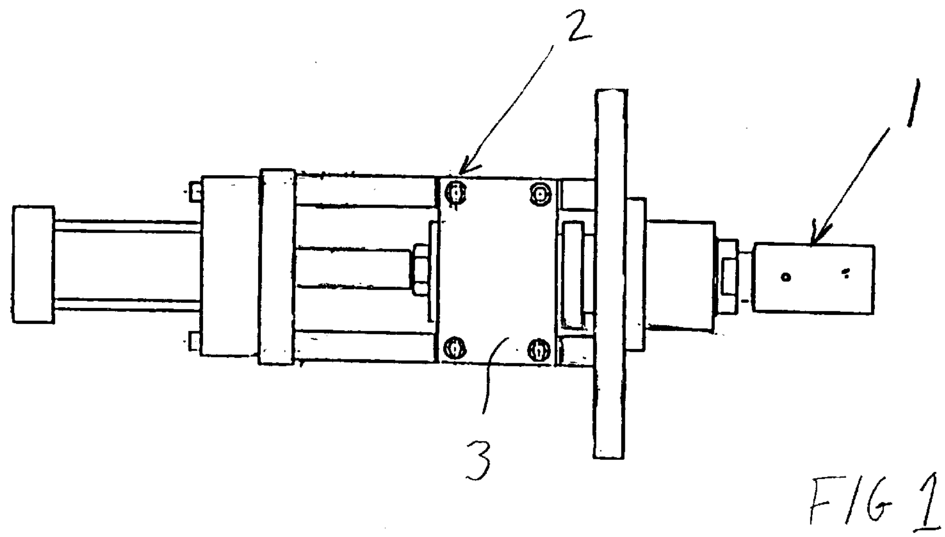
FIG. 1 is a top plan view of an assembly of a hydraulic cylinder and an end cap forming die in accordance with the present invention.

With reference to FIG. 1, an end cap forming die 1 in accordance with the present invention is illustrated. End cap forming die 1 is connected to a hydraulic cylinder assembly 2 that is used to reciprocate a plunger in end cap forming die 1. As will be discussed, end cap forming die is used in connection with an extrusion die (designated hereinafter by reference number 4). Hydraulic cylinder assembly 2 is moved in and out of a working position with respect to the extrusion die by a separate hydraulic cylinder assembly (not shown) that is connected to a mounting plate 3.

Figure 2:
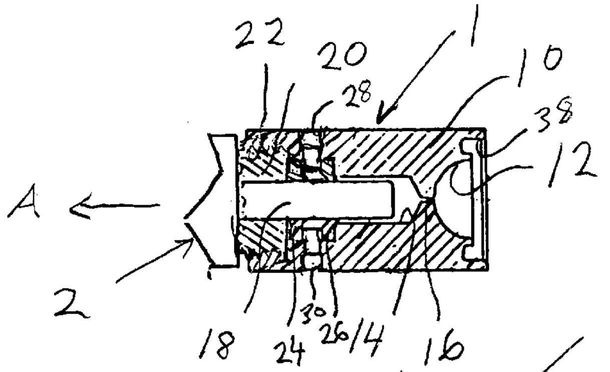
FIG. 2 is a fragmentary sectional view of FIG. 1 illustrating the end cap die shown in FIG. 1.

With additional reference to FIG. 2, end cap forming die is provided with a body 10 having an end cap forming cavity 12 of hemispherical shape to form the end cap. As will be discussed, the tube during extrusion moves under the pressure of extrusion in a direction indicated by arrow head "A". As a result ceramic material is thereby extruded or forced into end cap forming cavity 12 to assume the hemispherical shape thereof.

Body 10 is also provided with a backfill reservoir 14 of cylindrical configuration and a passageway 16 communicating between backfill reservoir 14 and end cap forming cavity 12. When the ceramic tube is extruded into end cap forming cavity 12, the ceramic material is thereby also forced by the forward travel of the extrusion through passageway 16 and into backfill cavity 14. Thereafter, the ceramic material within backfill reservoir 14 is forced back through passageway 16 and into end cap forming cavity 12 to compact the ceramic material so that the ceramic material has a substantially uniform density. The substantially uniform density alleviates the type of defects that are caused by discontinuities within the extrusion produced by the spider support for the mandrel contained within the extrusion die.

A plunger 18 in the form of an elongated cylinder projects into backfill reservoir 14 and is reciprocated by hydraulic cylinder assembly 2. Hydraulic cylinder assembly 2 is provided with a threaded fitting 20 that is threadably received within a threaded end bore 22 of body 10, thereby, to threadably connect body 10 to hydraulic cylinder assembly 2. A pair of nylon wipers 24 and 26 are preferably provided to prevent ceramic material from being drawn into hydraulic cylinder assembly 2 during reciprocation of plunger 18.

It is to be noted that end cap forming cavity 12, passageway 16, and backfill reservoir 14 are all coaxial to facilitate the action and connection of hydraulic cylinder assembly 2 to end cap forming die 1. As may be appreciated, other configurations are possible.

Set between wipers 24 and 26 are ports 28 and 30 that communicate with the interior of backfill reservoir 14. In the illustration, plunger 18 is in a position that it would occupy after having forced ceramic material from backfill reservoir 14 into end cap forming cavity 12. When ceramic material is forced into backfill cavity 14, plunger 18 is retracted by moving in the direction indicated by arrowhead "A". In such a position, ports 28 and 30 are uncovered and ceramic material and air flows out of body 10. When ceramic material is to be compacted within end cap forming cavity 12, plunger 18 is reciprocated in a direction opposite to arrowhead "A" to also cover ports 28 and 30, thereby to prevent the escape of ceramic material from body 10.

During the end cap forming process, after backfill reservoir 14 is filled with material and air and ceramic material is allowed to escape from ports 28 and 30, the extrusion process is suspended. During backfill, plunger 18 is reciprocated into its illustrated position to force ceramic material back through passageway 16 and into end cap forming cavity 12.

As may be appreciated, although not illustrated, a potential alternative embodiment is to continue the extrusion during the backfill operation to further compact the material. In a further alternative embodiment, instead of removing material from ports 28 and 30, ports 28 and 30 could be connected to a vacuum pump to remove the air within ceramic forming material located within backfill reservoir 14. In such case, provision could be made for discharging residual ceramic material within backfill reservoir 14. A still further embodiment, not preferred, would be to backfill the entire amount of ceramic material forced into backfill cavity 14 without any provision for the escape of ceramic material or air.

Figure 3:
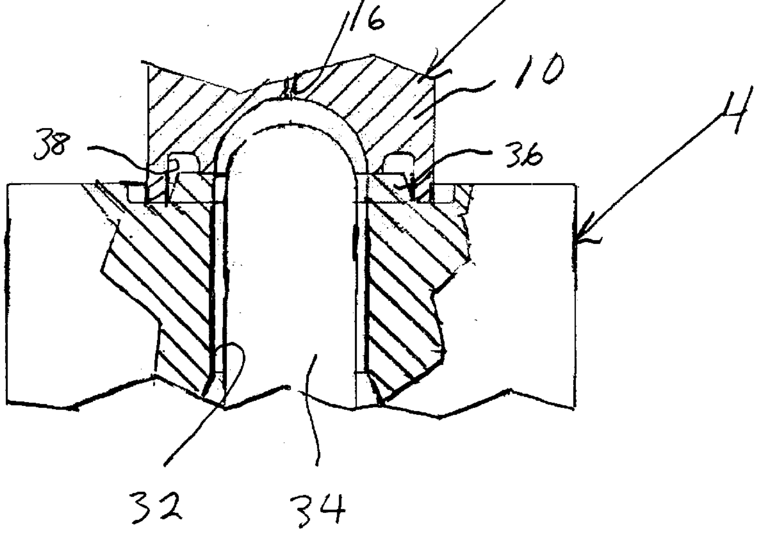
FIG. 3 is an enlarged, fragmentary view of an end cap die in accordance with the present invention situated against a extrusion die from which a cylindrical ceramic tube is extruded.

With further reference to FIG. 3, end cap forming die 1 is illustrated in its operating position against an extrusion die 4 of known configuration. Extrusion die 4 has a central passageway 32 and a mandrel 34. During extrusion, ceramic material is forced between mandrel 34 and passageway 32 to assume a tubular shape. In order to assure that end cap forming die 1 is positioned correctly with respect to extrusion die 4, a locating rib 36 of annular configuration is provided. Body portion 10 of extrusion die 1 is provided with an annular groove 38 that contacts the edge of rib 36 30 as to be centered with respect to extrusion die 4.

After an end cap is formed within an extrusion, end cap forming die 1 is removed from extrusion die 4 and extrusion of the ceramic tube continues. As may be appreciated as the tube is extruded, provision must be made for air to enter the extrusion. For such purposes, in a known manner, mandrel 34 is provided with a poppet valve and an air passage to allow for the passage of air.

For tube diameters up to about 1" a 75-ton hydraulic extrusion ram is used in connection with extrusion die 4. In such embodiment, passageway 16 can have a diameter from about 2/32inches to 4/32inches. Further, the primary extrusion pressure assuming a formable ceramic piece with a moisture content from between about 10 and about 15 percent will be between about 1800 and about 2700 psi. In such an apparatus, plunger 18 will exert a pressure anywhere from between about 350 psi to about 850 psi with the actuation time of plunger 18 or the time in which ceramic material is forced from backfill reservoir 14 into end cap forming cavity 12 being from between about 1 and about 10 seconds. As can be appreciated to those skilled in the art, alternative parameters can be determined for larger tube sizes and for different ceramic materials.

While the present invention has been described to a preferred embodiment, as will occur to those skilled in the art, numerous additions, omissions and changes may be made without departing from the spirit and scope of the present invention.

I claim:

1. A process for forming an end cap in an end of a ceramic tube, said process comprising:

positioning an end cap forming die against a tube forming die, said end cap forming die having an end cap forming cavity, a backfill reservoir, and a passageway communicating between said backfill reservoir and said end cap forming cavity;

extruding said ceramic tube so that ceramic material forming said end of said ceramic tube is forced into said end cap forming cavity, through said passageway, and into said backfill reservoir; said back fill reservoir being elongated and having ports for discharging said ceramic material and air;

forcing said ceramic material from said backfill reservoir back through said passageway and into said end cap forming cavity by an elongated plunger projecting into said back fill reservoir and covering said ports during the forcing of said ceramic material to compact said ceramic material within said end cap forming cavity so that said ceramic material forming said end cap has a substantially uniform density; and a portion of said ceramic material and said air being discharged from said backfill reservoir prior to said ceramic material being forced back to said end cap forming cavity, said elongated plunger being retracted during discharge of said portion of said ceramic material from said backfill reservoir so that said ports are uncovered.

2. The process of claim 1, wherein said extruding of said tube is suspended prior to said ceramic material being forced from said backfill reservoir.

* * * * *